United States Patent [19]

Bobo et al.

[11] 4,126,405
[45] Nov. 21, 1978

[54] TURBINE NOZZLE

[75] Inventors: Melvin Bobo, Cincinnati; James W. Heyser, Fairfield; L. D. Shotts, Forest Park; Raymond W. Wisbey, Sharonville, all of Ohio

[73] Assignee: General Electric Company, Cincinnati, Ohio

[21] Appl. No.: 751,318

[22] Filed: Dec. 16, 1976

[51] Int. Cl.² ................................................ F01D 5/14
[52] U.S. Cl. .................................. 415/115; 60/39.66; 416/97 A
[58] Field of Search ............... 415/115, 116, 117, 159, 415/175, 216; 416/90–97; 60/39.66

[56] References Cited
U.S. PATENT DOCUMENTS

| | | | |
|---|---|---|---|
| 2,836,393 | 5/1958 | Payne et al. | 415/115 |
| 2,847,185 | 8/1958 | Petrie et al. | 415/115 |
| 2,849,209 | 8/1958 | Burgess et al. | 415/115 |
| 3,075,744 | 1/1963 | Peterson | 415/115 |
| 3,443,791 | 5/1969 | Sevetz et al. | 415/115 |
| 3,781,125 | 12/1973 | Rahaim | 415/115 |
| 3,975,901 | 8/1976 | Hallinger | 415/117 |

Primary Examiner—C. J. Husar
Attorney, Agent, or Firm—Dana F. Bigelow; Derek P. Lawrence

[57] ABSTRACT

A segment of a turbomachine nozzle is tangentially held in position by a pair of lugs extending radially from the outer and inner bands, respectively, at opposite ends of the segment, and resting against the adjacent support structure. In this way, the stress in the vanes and bands is maintained at a low level to thereby allow the use of high temperature, relatively low strength materials and reduced cooling measures. The lugs form integral end caps on the vane's one end and the cooling air enters the opposite end thereof.

11 Claims, 4 Drawing Figures

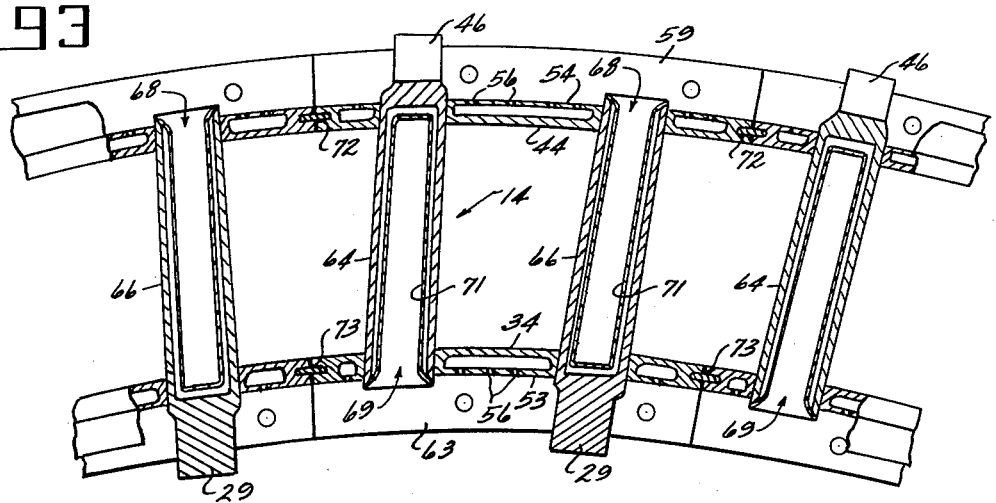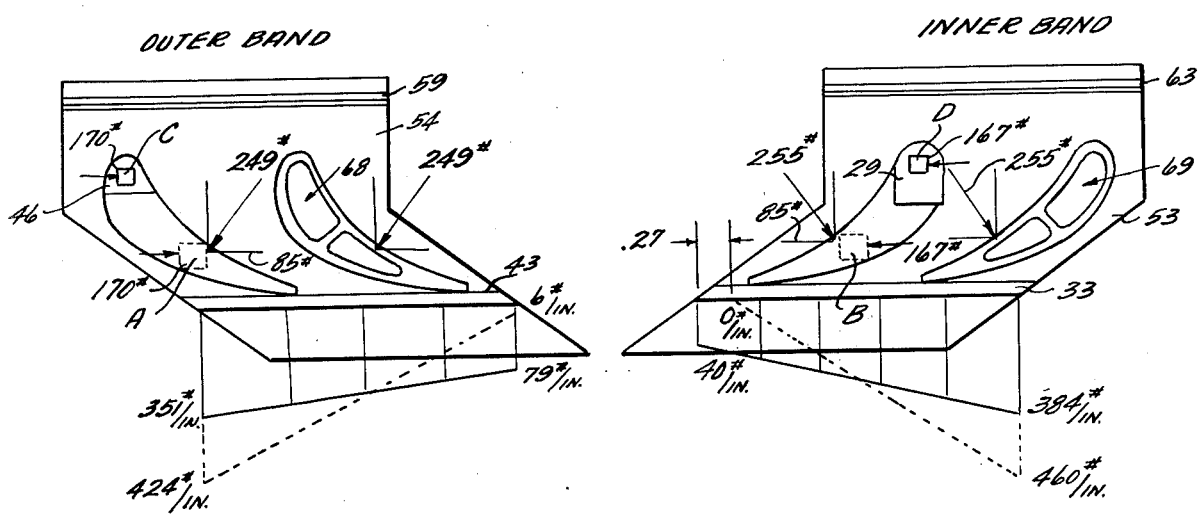

TURBINE NOZZLE

BACKGROUND OF THE INVENTION

This invention relates generally to turbomachines and, more particularly, to vane structures for turbines.

The invention herein described was made in the course of or under a contract, or a subcontract thereunder, with the United States Department of the Air Force.

In preforming the function of directing the high velocity gases toward a turbine blade at the proper angle, the stationary nozzle guide vane is exposed to very high temperatures and pressures. In order to react against these pressures, the turbine nozzle, or segments thereof, are normally secured to the support structure by way of flanges extending radially from the outer or inner band, with the flanges being bolted to the support structure to render a relatively rigid combination. Due to the high temperature gases, it is then necessary to cool the nozzle segments by way of bleed air from the compressor or the like. In order to increase the efficiency of a turbine, it is desirable to increase the temperature of the gases flowing therethrough. Accordingly, manufacturers of turbomachines are continuously striving for the development of materials which can withstand this environment of higher pressures and temperatures, and simultaneously to improve the methods of cooling such structures.

In the development of high temperature materials such as ceramics and oxide-dispersion-strengthened(ODS) material, the advantages of allowable higher temperatures are somewhat offset by the lower strength of the material. Nozzles made from the lower strength materials are precluded from the use of flanges because of the excessive bending stress which they are not capable of sustaining. Accordingly, segments made from these materials must be fixed within the stationary structure by means other than bolted flanges. Further, the mounting means must provide for a substantially even load distribution, for the differential thermal growth of associated components, and for the freedom of constraints from adjacent components which may prevent the nozzle segment from loading properly against its support structure so as to provide a seal against cooling air leakage into the flow path.

The importance of providing for the use of high melting point, and hence low strength, alloys, becomes more obvious when considering the reduction in engine efficiency with the increased use of cooling air. In other words, if greater amounts of cooling air are required with increased temperature levels in the turbine, then the required bleed air from the compressor represents a corresponding decrease in the overall efficiency of the engine. Accordingly, it is desirable to reduce the amount of turbine cooling air to a minimum.

It is therefore an object of the present invention to provide a turbine nozzle configuration which allows the use of high temperature, low strength materials.

Another object of the present invention is the provision in a turbine nozzle configuration for reducing the bending stresses in the bands and vanes.

Yet another object of the invention is the provision for a turbine nozzle configuration which is supported in a surrounding structure without the use of flanges.

Still another object of this invention is the provision for a turbine nozzle segment configuration which imposes a substantially even load distribution against its support structure to thereby effectively seal against cooling air leakage.

A further object of the present invention is to provide a turbine nozzle configuration which requires a minimum amount of cooling air.

Yet another object of the present invention is the provision of a turbine nozzle configuration which is simple in construction, economical to manufacture, and effective in use.

These objects and other features and advantages become more readily apparent upon reference to the following description when taken in conjunction with the appended drawings.

SUMMARY OF THE INVENTION

Briefly, in accordance with one aspect of the invention, the segments of a stationary turbine nozzle are flexibly installed in the support structure of the turbine by the use of a pair of lugs disposed against the support structure so as to transmit circumferential loads thereto without causing high levels in stress in either the vanes or the bands.

By another aspect of the invention the lugs extend radially from the outer and inner bands, respectively, one at either end of the turbine segments so as to minimize the bending moments and the bending stresses in the bands and the vane airfoils.

By yet another aspect of the invention, the lugs are located to coincide with one end of the airfoil vane so as to form an end cap thereon, while the other end of the vane is open to a cooling air plenum to provide cooling air to the internal structure of the vane. Thus, cooling air enters adjacent vanes by alternate outer and inner band openings, while the lugs which are inserted in the other ends of the vanes simultaneously act as load stops and as end caps for the vanes.

Another aspect of the present invention locates the lugs in an axial location which causes a counterbalancing moment in the skewed-shaped segment such that the tendency of the aerodynamic loads to rotate the segment and completely unload one end of its axial support rail is offset so as to establish a positive load all along the surface of the rail to prevent local separation from the supporting structrue which would otherwise allow leakage of the cooling air.

In the drawings as hereinafter described, the preferred embodiment is depicted; however, various other modifications and alternate constructions can be made thereto without departing from the true spirit and scope of the invention.

BRIEF DESCRIPTION OF THE DRAWINGS

FIG. 3 is an axial, cross-sectional view of the vanes as seen along lines 3—3 of FIG. 2.

FIG. 4 is a schematic illustration of the loading distribution on the vane segment of the present invention.

DESCRIPTION OF THE PREFERRED EMBODIMENT

Figure 1:
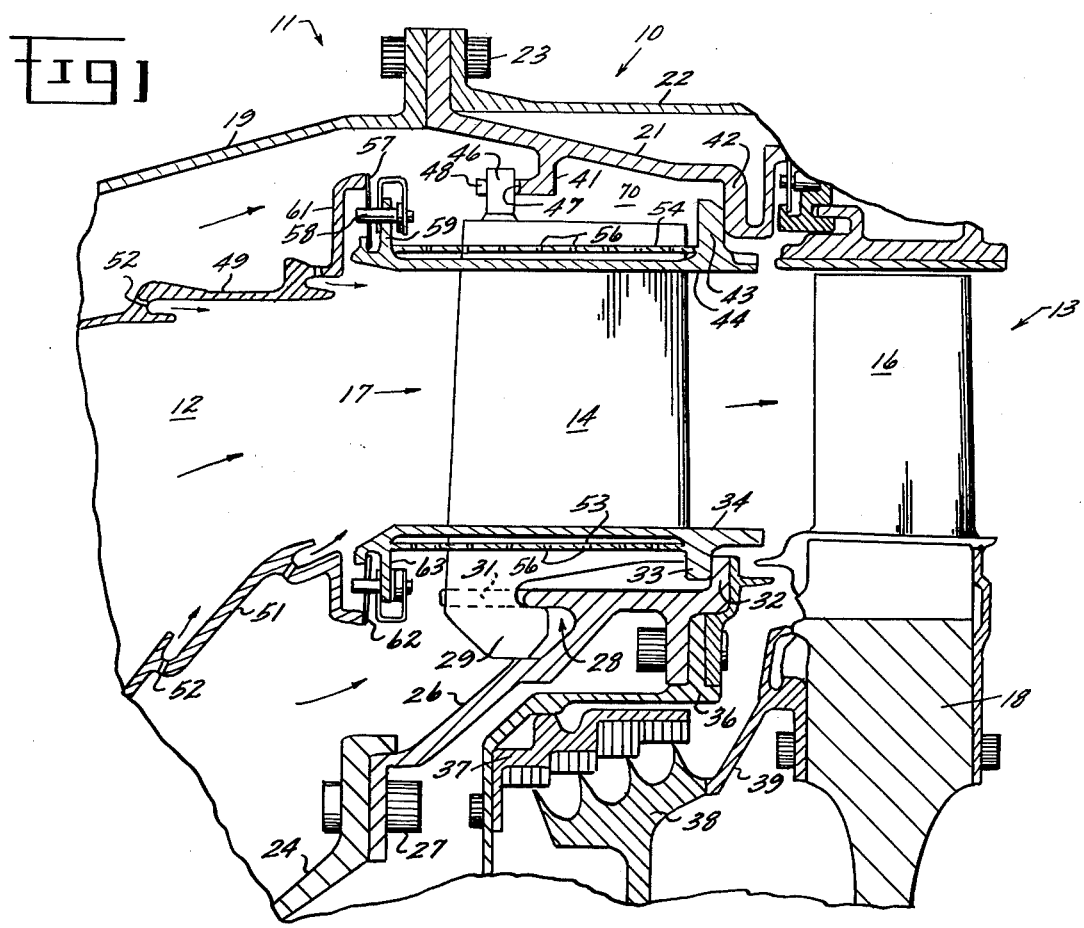
FIG. 1 is a fragmentary sectional view of a turbine embodying the nozzle structure of the present invention.

Referring now to FIG. 1, the invention is shown generally at 10 as incorporated into a turbomachine 11 including a combustor 12 which functions to ignite a fuel and air mixture and conduct and resulting hot gases downstream to a high pressure turbine 13. The high pressure turbine 13 may include any number of stages with each stage comprising a row of turbine nozzles and a row of turbine blades or buckets alternately disposed in a manner well known in the art, the nozzles being designated as 14 and the blades 16 in the single stage shown. In operation, the high pressure, high temperature gases leave the combustor 12 and flow along the main gas stream 17 to enter the first stage nozzle 14 where the direction of flow is diverted to properly enter the blade row 16 so as to thereby transmit energy to rotate the turbine disc 18. The hot gases continue to flow downstream and transmit energy to other turbine stages and are finally discharged from the exhaust nozzle of the turbomachine in a low energy state.

The support structure for the high pressure turbine includes, on the outer side, a combustor casing 19, an outer turbine ring 21 and a turbine casing 22, also secured together by a plurality of circumferentially spaced bolts 23. On the radially inner side of the turbine, there is an inner combustor casing 24 secured to an inner turbine ring 26 by a plurality of bolts 27. The inner turbine ring 26 includes an annular groove or indentation 28 into which a lug 29, extending radially inward from the nozzle 14, is frictionally disposed. An axial boss 31 extends forwardly from the inner turbine ring 26 to rest against the side of lug 29 for purposes of retaining it from movement in the circumferential direction. On the rear side of the inner turbine ring 26, a flange 32 extends radially outward to act as an axial load stop for the rear inner rail 33 projecting radially inward from the inner band 34 to frictionally engage the flange 32. Also connected to the inner turbine ring 26 is a bracket 36 which in turn supports a stationary outer seal 37. The associated rotating inner seal member 38 is supported by a bracket 39 extending forward from the turbine disc 18.

On the radially outer side of the turbine nozzle, the outer turbine ring 21 provides support by way of an axially extending stop 41 and a U-flange 42. The U-flange 42 provides support in the axial direction by engaging the rear face of the rear outer rail 43 extending radially outwardly from the outer band 44. The axially extending stop 48 frictionally engages an outer lug 46 extending radially outwardly from the vane 14 to provide support in the circumferential direction.

Cooling of the system components is accomplished by the circulation of cooler high pressure air in a manner generally well known in the art. Cooling air derived from a compressor bleed manifold or the like is circulated around the annular combustor 12, between the combustor outer casing 19 and the combustor outer liner 49, and between the inner combustor casing 24 and the inner combustion liner 51. A portion of the cooling air passes through holes 52 in the combustor liner to cool the inner walls thereof, while most of the air flows downstream as indicated by the arrows to cool the turbine nozzles and shrouds. The vane inner and outer bands, 34 and 44, respectively, are cooled by the impingement process wherein the impingement plates 53 and 54 are in closely spaced, parallel relationship with the inner and outer bands 34 and 44, respectively, and have a plurality of small holes 56 disposed therein to impinge high pressure cooling air against the surfaces of the bands to cause a substantial cooling effect thereto. The bands are further cooled by allowing the impingement air to flow through discrete holes in the bands, establishing a film of cooling air to protect the bands from the hot gas.

At the forward end of the vane stage there is, of course, no need to provide any support for the vanes, but it is necessary to prevent the leakage of air between the combustor and vane stage interface. Accordingly, a leaf seal 57 or the like is held in place by a plurality of pins 58 and is disposed between the vane forward outer rail 59 and the combustor rear flange 61 for that purpose. Similarly, a leaf seal 62 is attached to the forward inner rail 63 for the same purpose.

Figure 2:
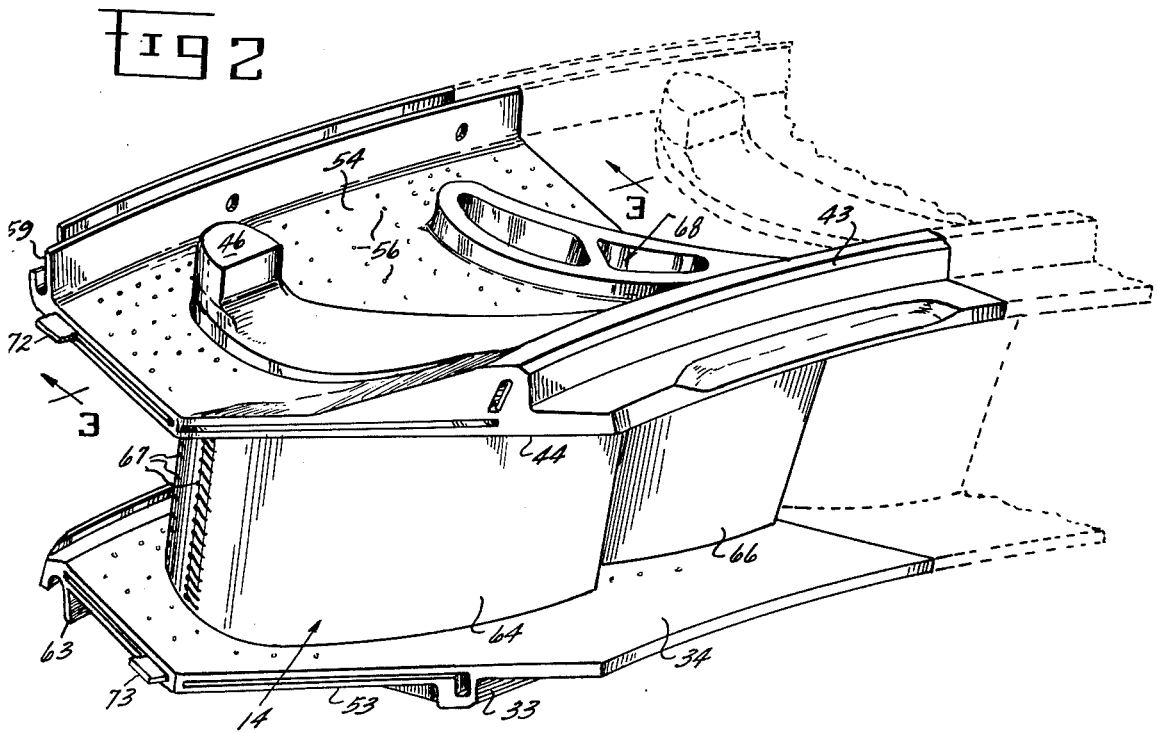
FIG. 2 is a perspective view of one segment of the nozzle in accordance with the present invention as it interfaces with an adjoining segment shown in phantom lines.

Referring now to FIG. 2, a turbine nozzle segment is shown in more detail and includes the inner and outer band segments 34 and 44 having a pair of circumferentially spaced, airfoil-shaped vanes 64 and 66 rigidly disposed therebetween. Each of the vanes is substantially hollow and has a multitude of holes 67 disposed in a predetermined manner about its skin to allow the air to pass from the internal cavity to flow over its skin for cooling purposes. In order to allow the cooling air to enter the vane, each vane has one open end 68 which communicates with a cooling air manifold 70 (see FIG. 1), to flow cooling air to the internal cavities of the vane. As can be seen in FIGS. 2 and 3, the vane open ends are alternately disposed in the outer and inner bands, with each segment having one vane open end 68 assosicated with the outer band 44 and another vane open end 69 associated with the inner band 34. The vanes may have an impingement insert 71 disposed in their internal cavities to facilitate the cooling process.

Located at the opposite end of each of the vanes is a lug for supporting the segment in the tangential direction. As can be seen, each nozzle segment has an inner lug 29 and an outer 46 lug with each lug acting as an end cap to prevent leakage of air from one end of the vane. It can be seen that the lugs 29 and 46 are located at opposite circumferential ends of the segment so that the reaction of the supporting structure acting thereon will tend to minimize the bending moment in the vanes and bands. This is in contrast with the design that is cantilevered from one end as is common in the art. Any aerodynamic loading which is not taken up directly by the lugs, and is instead transmitted through the bands, is transmitted from that end of the vane which has no lug to the adjacent vane which does have a lug. This results in a tensile load in one band and a compressive load in the other band for that particular portion of the segment. As a result, the only bending that occurs is that from the curvature of the bands, and this is very small. In other words, considering that portion of the segment between vanes 64 and 66, when the vanes are aerodynamically loaded, the outer band 44 will be in compression and the inner band 34 will be in tension. An added advantage of the low level of bending stress in the bands is that the vane-to-band joint is lightly loaded and permits the use of low strength joining methods such as brazing or the like.

When using a segmented nozzle approach it is of course necessary to provide seals 72 and 73 between the respective outer and inner bands of the segments. Each segment may contain any number of vanes, with the size of the segment being selected such that the arc length of the band is small enough to prevent build-up of hoop stresses which might result in band cracking.

Because of the skewed shape of a segment as shown in FIG. 4, the aerodynamic loads tend to rotate the part and completely unload one end of the axial support rail. This is obvious to one skilled in the art when considering the forces as indicated at the vane centers of pressures. If the circumferential load stops are placed in positions A and B, in the outer and inner bands, respectively, the reaction forces are in substantial axial alignment with the vane center of pressure and there is therefore no offsetting of the rotating moment. Consequently, the reaction forces on the rails 43 and 33 are distributed very unevenly. For example, in the outer band at one end of the rail segment the pressures are 424 lb/in while at the outer end of the segment they are only 6 lb/in. Similarly, the pressures on the rail segment 33 are 460 lb/in at one end thereof and zero at the other end thereof. Such an uneven distribution is obviously undesirable since it tends to rotate the segments and cause leakage of the cooling air at the unloaded ends of the segments. Accordingly, the present invention acts to offset this rotating moment by locating the circumferential load stops or lugs in positions which are axially well forward of the vane centers of pressure so as to create a counterrotating moment. With this arrangement, wherein on the outer band the lug is located at position C, the counteracting moment tends to more evenly distribute the forces as shown in the solid lines so as to provide a pressure of 351 lb/in on one end of the segment and 79 lb/in at the other end thereof. Similarly, when the lug is placed at position D on the inner band, the distribution is such that the pressure on the rail 33 is equal to 384 lb/in at one end of the segment and 40 lb/in at the other end thereof. Even though there is still an uneven distribution, the pressures of 79 lb/in and 40 lb/in on the outer and inner bands, respectively, provide sufficient load on the rails to prevent local separation from the supporting structure and resultant leakage of cooling air.

It will be understood that while the present invention is being described in terms of a preferred embodiment, it may take on any number of other forms while remaining within the scope and intent of the invention. For example, while the present invention has been described in terms of use with a single stage high pressure turbine, it may just as well be employed in a plurality of stages of either high pressure or low pressure turbines. Further, it will be recognized that it may be applicable with varying sized segments and varying numbers of vanes within the segments.

Having thus described the invention, what is claimed as novel and desired to be secured by Letters Patent of the United States is:

1. An improved turbomachine nozzle segment of the type having at least one hollow vane interposed between outer and inner bands, wherein the improvement comprises:
   (a) aperture means in one of the bands for providing fluid communication to the hollow cavity of the vane, said aperture means being coincident with an open end of said vane; and
   (b) circumferential stop means adjacent the other band for circumferential reaction against the frame structure of the turbomachine, said stop means being attached to the other end of said vane which projects through said other band.

2. An improved turbomachine nozzle segment as set forth in claim 1 wherein the segment includes a pair of hollow vanes and further wherein each of the outer and inner bands has both aperture means and circumferential stop means.

3. An improved turbomachine nozzle segment as set forth in claim 1 wherein the segment includes one vane having a stop means adjacent its outer end and an aperture means adjacent its inner end, and a second vane having a stop means adjacent its inner end and an aperture means adjacent it outer end.

4. An improved turbomachine nozzle segment as set forth in claim 1 wherein said circumferential load stop means includes structure for reacting axially against the frame structure of the turbomachine.

5. An improved turbomachine nozzle segment as set forth in claim 1 wherein the axial location of said circumferential stop means is located entirely forward of the vane center of pressure.

6. An improved turbine nozzle segment of the type having at least a pair of hollow vanes fixed between inner and outer bands, wherein the improvement comprises:
   (a) means for conducting the flow of cooling air through the outer band into one of the vanes and for conducting the flow of cooling air through the inner band into the other of the vanes; and
   (b) circumferential stops located on the outer and inner bands, said stops being coincident with the vanes at their respective ends opposite the flow conducting means and adapted to transmit a circumferential load to a frame structure of the turbine.

7. An improved turbine nozzle segment as set forth in claim 6 wherein the vanes comprise aerodynamic structures which extend radially through said outer and inner bands.

8. An improved turbine nozzle segment as set forth in claim 6 wherein said flow conducting means comprises a vane-shaped aperture formed in each of the outer and inner ends.

9. An improved turbine nozzle segment as set forth in claim 6 wherein said circumferential stops are located axially forward of the vane centers of pressure.

10. An improved turbine nozzle segment as set forth in claim 6 and including rails attached to the rear sides of said bands, said rails being capable of transmitting axial forces to supporting structure at locations that are substantially in radial alignment with said bands.

11. An improved turbine nozzle segment as set forth in claim 10 wherein said circumferential stops are located axially forward on the vane so as to create a moment with respect to the vane centers of pressure to thereby provide a positive loading condition on said rails during aerodynamic loading.

* * * * *